US010746556B2

(12) United States Patent
Calinao et al.

(10) Patent No.: US 10,746,556 B2
(45) Date of Patent: Aug. 18, 2020

(54) RECOMMENDATION SYSTEM AND METHOD TO EVALUATE THE QUALITY OF SIDEWALKS AND OTHER PEDESTRIAN FLOW ZONES AS A MEANS TO OPERATIONALIZE WALKABILITY

(71) Applicants: Bernardita Calinao, New York, NY (US); Marie Rusin, New York, NY (US); Andrei Radulescu, Kansas City, MO (US)

(72) Inventors: Bernardita Calinao, New York, NY (US); Marie Rusin, New York, NY (US); Andrei Radulescu, Kansas City, MO (US)

(73) Assignee: Walkspan, Inc., New York, NY (US)

( * ) Notice: Subject to any disclaimer, the term of this patent is extended or adjusted under 35 U.S.C. 154(b) by 130 days.

(21) Appl. No.: 16/010,697

(22) Filed: Jun. 18, 2018

(65) Prior Publication Data
US 2018/0364059 A1    Dec. 20, 2018

Related U.S. Application Data

(60) Provisional application No. 62/520,789, filed on Jun. 16, 2017.

(51) Int. Cl.
*G06F 17/00* (2019.01)
*G01C 21/34* (2006.01)
(Continued)

(52) U.S. Cl.
CPC ..... *G01C 21/3446* (2013.01); *G01C 21/3461* (2013.01); *G01C 21/3629* (2013.01);
(Continued)

(58) Field of Classification Search
CPC ..... G01C 21/3446; G06N 5/045; G06N 5/046
See application file for complete search history.

(56) References Cited

U.S. PATENT DOCUMENTS

| 6,321,158 B1 * | 11/2001 | DeLorme | G01C 21/26 |
| | | | 340/995.16 |
| 6,622,084 B2 * | 9/2003 | Cardno | G06Q 10/02 |
| | | | 701/425 |

(Continued)

OTHER PUBLICATIONS

A Feasibility Study of Crowdsourcing and Google Street View to Determine Sidewalk Accessibility, Kotaro Hara et al, Oct. 12, 2012, Assets '12, 2 pages.*

(Continued)

*Primary Examiner* — Mohammed H Zuberi
(74) *Attorney, Agent, or Firm* — Kunzler Bean & Adamson

(57) ABSTRACT

A computer learning, assessment and recommendation system to generate new information about the quality and degrees of walkability of sidewalks and walking routes through the collection, assessment and manipulation of large amounts of visual and geographic data, a scoring system, a rule-based computational methods and selected data representation are provided. Micro and macro data, methods and systems for sidewalk assessment generate various characteristics and qualities of routes creating general, locational and navigational functions using attributes and categories identified as important to walkability or to the experience of walking. Computed scores and recommendations displayed in maps and other visual tools and apps can be used by multiple client and sector groups including navigation, real estate, fitness, tourism and urban and rural development planning. This abstract complies with rules requiring abstract submission but does not limit the scope, interpretation or full meaning of the claims.

18 Claims, 21 Drawing Sheets

(51) Int. Cl.
*G06N 5/04* (2006.01)
*G06T 7/00* (2017.01)
*G06F 3/16* (2006.01)
*G01C 21/36* (2006.01)
*G06K 9/00* (2006.01)
*G06N 20/00* (2019.01)
*G06K 9/62* (2006.01)
*G06N 5/00* (2006.01)
*G06F 3/0482* (2013.01)

(52) U.S. Cl.
CPC ......... *G06F 3/167* (2013.01); *G06K 9/00671* (2013.01); *G06K 9/627* (2013.01); *G06N 5/003* (2013.01); *G06N 5/045* (2013.01); *G06N 5/046* (2013.01); *G06N 20/00* (2019.01); *G06T 7/0002* (2013.01); *G06F 3/0482* (2013.01); *G06T 2207/10016* (2013.01); *G06T 2207/20081* (2013.01); *G06T 2207/30184* (2013.01)

(56) References Cited

U.S. PATENT DOCUMENTS

| | | | | |
|---|---|---|---|---|
| 7,894,984 | B2* | 2/2011 | Rasmussen | G06Q 40/12 701/452 |
| 7,920,967 | B1* | 4/2011 | Harris | G01C 21/3626 340/995.19 |
| 8,090,532 | B2* | 1/2012 | Tashev | G06Q 30/0273 340/990 |
| 8,340,633 | B1* | 12/2012 | Rege | H04M 15/28 455/406 |
| 8,712,684 | B2* | 4/2014 | Van Hende | G01C 21/3407 701/425 |
| 9,046,370 | B2* | 6/2015 | Annapureddy | G01C 21/00 |
| 9,142,141 | B2* | 9/2015 | Yeh | G16H 40/67 |
| 2006/0146719 | A1* | 7/2006 | Sobek | G01C 21/20 370/238 |
| 2009/0089149 | A1* | 4/2009 | Lerner | G06Q 10/047 705/7.34 |
| 2012/0143497 | A1* | 6/2012 | Van Hende | G01C 21/343 701/432 |
| 2019/0017835 | A1* | 1/2019 | Pickover | G06N 5/04 |

OTHER PUBLICATIONS

"An App That Tells You How Walkable a Street Really Is", 2/2312013, https://www.citylab.com/life/2013/02/app-tells-you-how-walkable-street-really/4759/, 4 pages.*

Meet the Crowdsourcing App That Promises to Improve Denver's Sidewalks, David Sachs, Jul. 14, 2015, https://denverstreetsblog.org/2015/07/14/meet-the-crowdsourcing-app-that-promises-to-improve-denvers-sidewalks/, 7 pages.*

Sobek, Et Al, "U Access: A Web-Based System for Routing Pedestrians of Differing Abilities", Journal of Geographical Systems, vol. 8, Issue 3, Apr. 26, 2006, pp. 269-287.*

* cited by examiner

RECOMMENDATION SYSTEM AND METHOD TO EVALUATE THE QUALITY OF SIDEWALKS AND OTHER PEDESTRIAN FLOW ZONES AS A MEANS TO OPERATIONALIZE WALKABILITY

CROSS-REFERENCE TO RELATED APPLICATIONS

This application claims priority to U.S. Provisional Patent Application No. 62/520,789 entitled "Recommendation System and Method to Evaluate the Quality of Sidewalks and Walking Routes" and filed on Jun. 16, 2017 for Bernardita Calinao, which is incorporated herein by reference.

FIELD

The subject matter disclosed herein relates walkability assessment, data mining, data scraping, customized visual audit, object recognition, supervised machine learning, recommendation system, visual user interface system.

BACKGROUND

Description of the Related Art

Users often want to walk in unfamiliar areas.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 illustrates data collected from sidewalks through detailed walk surveillance/visual inventory technology;

FIGS. 6a and 6b lay out the rule-based scoring system for microscale and macroscale data;

DETAILED DESCRIPTION

Figure 1:
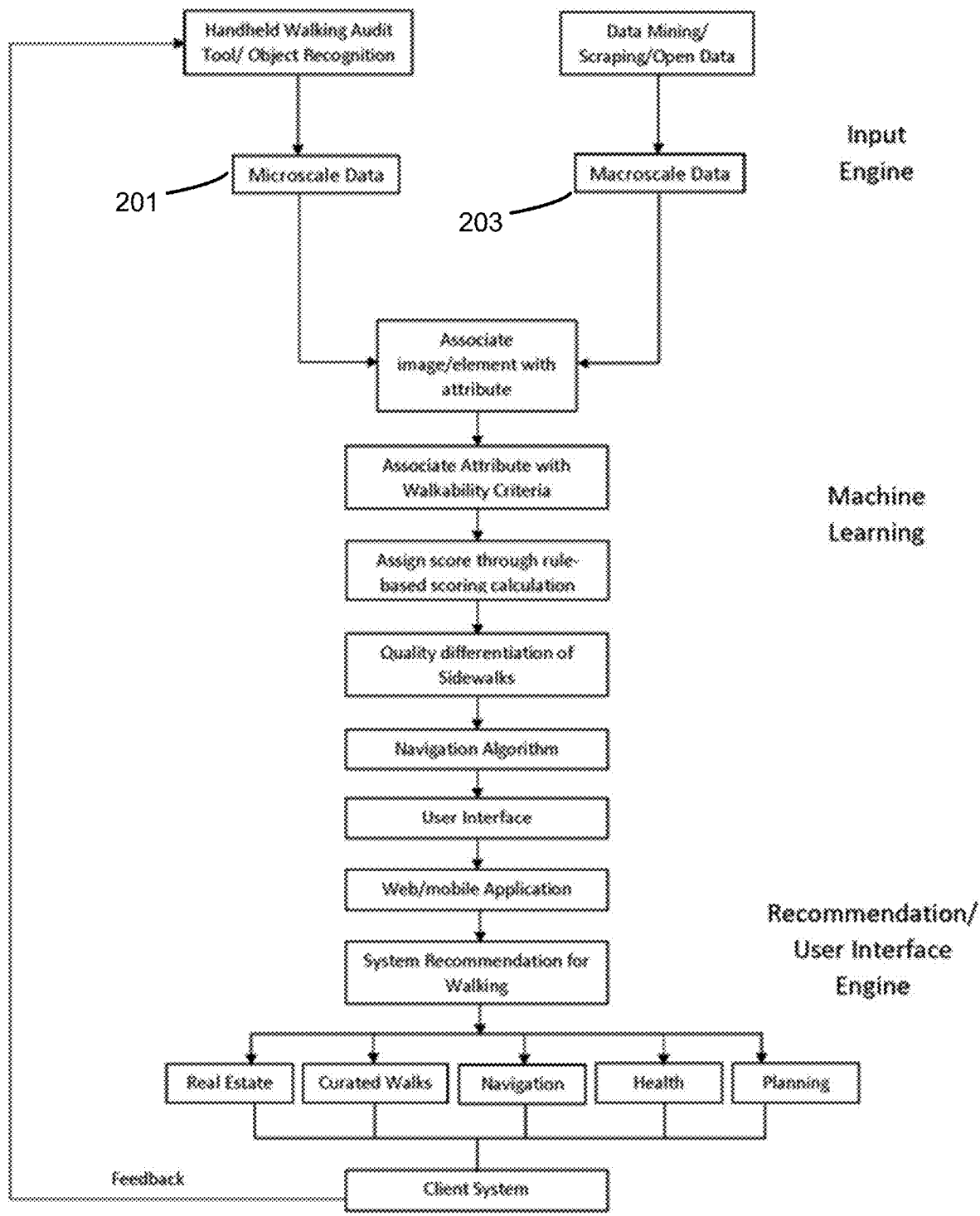
FIG. 1 presents the overall system diagram.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The embodiments may apply the following elements:

INPUT: Features of the built pedestrian corridor represented by physical attributes and human activities are collected at micro and macro data scale. Microscale data input includes fine-grained collection of tangible elements and human activities along sidewalks and other pedestrian walkways. Microdata is collected in the field using handheld electronic audit forms by trained assessors as well as trained object recognition technology. Macroscale data is collected through data mining, use of standard data scraping tools and huge open source data sets.

STEPS: Through a machine learning and recommendation system both micro and macro data are trained by the software to identify, assess, classify, catalog, score and select by way of an automated rule-based scoring selection and recommendation system. The method is applied to all attributes allowing them to fall under several categories and degrees of walkability.

OUTPUT: A recommendation and user interaction system are created from the trained data and machine learning system for a plurality of applications such as but not limited to: 1) wayfinding and navigation for best walkable routes, 2) real estate for best walkable neighborhood, 3) fitness for best route to meet health requirements, 4) walkability maps for planning and placemaking, and 6) curated walking routes.

KEYWORD: The term sidewalk may also refer to any form and shape of walk zones, pavements, segments and pedestrian network or pedestrian flow zones. Other keywords include, big data, object recognition, data scraping, data mining, rule-based assessment, supervised and unsupervised machine learning, recommendation system, geographic information systems, user interaction and web/mobile applications.

The description of elements in each figure may refer to elements of proceeding figures. Like numbers refer to like elements in all figures, including alternate embodiments of like elements.

To date, little attention is given to understand the character and quality of pedestrian corridors or sidewalks as we know it in the United States and other metropolitan cities worldwide. With the advent of object recognition and other machine learning and recommendation technologies, however, understanding the quality of sidewalks has become possible through micro and macro data collection and machine learning algorithms that bring out new information about the quality of sidewalks. Existing walkability techniques and tools such as Walk Score measure proximity to key destinations but do not inform the user about sidewalk character and quality. Unlike Walk Score, the invention has the ability to show sidewalks that are more walkable than others thereby increasing people's desire and willingness to walk through heightened walking experience. The quality of sidewalks is determined through a supervised machine learning system that generates new knowledge about degrees of walkability based on urban design and environmental factors such as, but not limited to, natural beauty, manmade beauty, utility, safety, connectivity, comfort, interest, legibility, equity, complexity and vitality measured at micro and macro scale and mapped on a geographic information system to create walkable routes for pedestrians to use. It is expected that this new information will have key users like millennials, baby boomers, fitness enthusiasts, tourists, and commuters and residents alike. The users intent to improve the quality of their walk would rely on the invention to find or rent homes, to navigate, for health fitness and for urban and regional planning. The tools enable the identification of walkability patterns from most walkable to least walkable through rule-based criteria scoring and recommendation system.

FIG. 1 presents the overall system diagram of the invention. The diagram has three sections: 1) sidewalk data engine (input), b) sidewalk machine learning engine (steps), and c) sidewalk user recommendation and interaction engine (output).

The Sidewalk Data Engine or input engine collects microscale and macroscale data from several sources. Microscale data is collected from an automated handheld visual audit system and an object recognition technology while macroscale data is collected through data mining and scraping and big data available through open source.

The Machine Learning Engine (steps) receives all input data and automatically associates them with sidewalk attributes and walkability criteria created for the system. Attributes are trained to fall under anyone of the 11 walkability criteria and further trained to fall under a scoring system. The rule-based scoring system facilitates quality differentiation among the sidewalks generating information about the degrees of walkability of sidewalks within a geographic setting. The algorithm providing navigation likewise is trained to extract the walkability data when queried about route origin and destination.

The Recommendation and User Interface Engine (output) offers the new set of information about walkability through web and mobile applications. Separate system recommendations are made available for several sector and client groups including, but not limited to, real estate, navigation, health, planning, place making and curated walking. The client system loops back to the Data engine through a crowdsourcing mechanism that automatically refreshes data on a timely basis.

Figure 2:
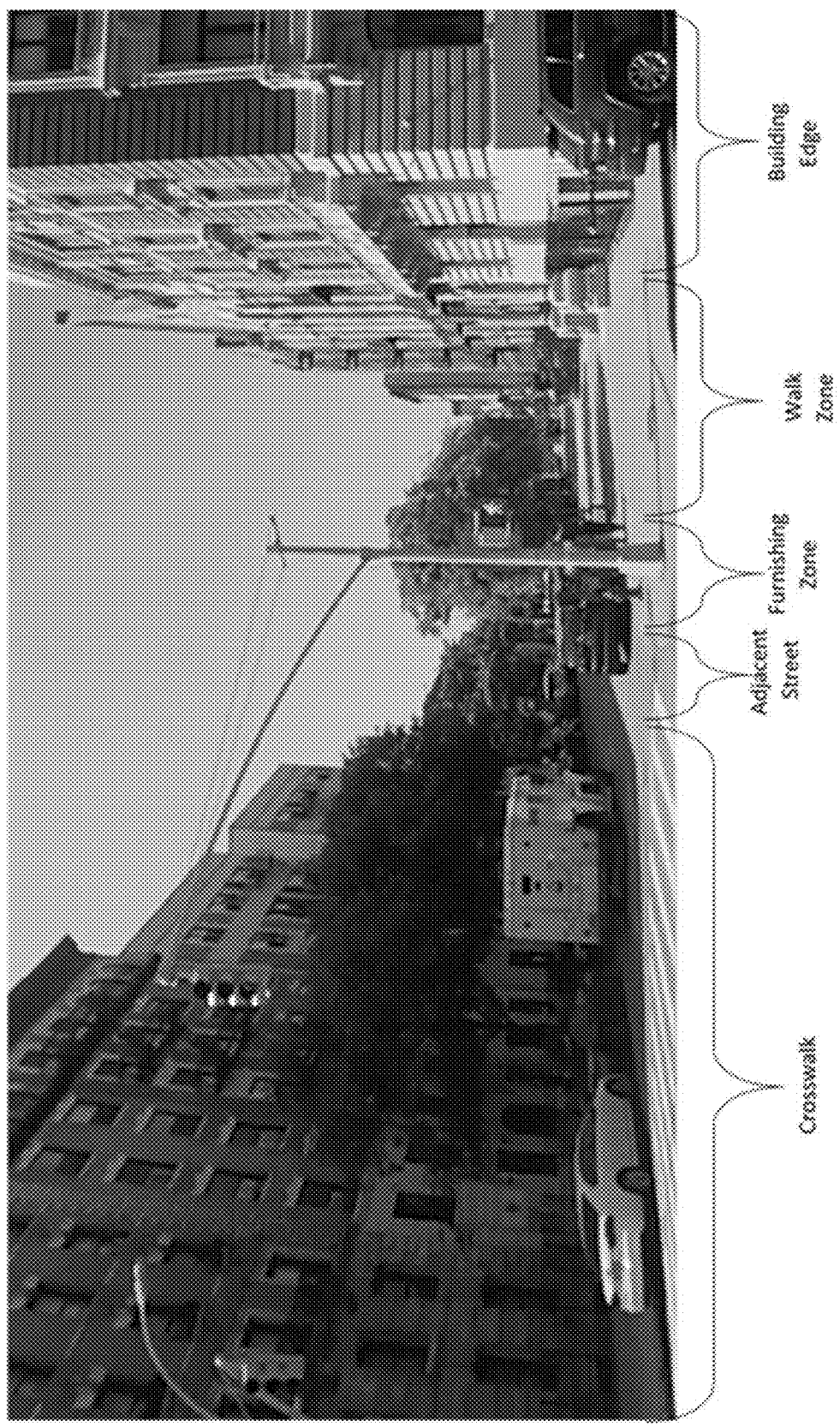
FIG. 2 illustrates the breakdown of a sidewalk corridor into sections.

FIG. 2 illustrates the breakdown of the sidewalk corridor into sections. These units of analyses ensure that the visual audit captures all walkability elements. The five distinct sections are the building edge (BE), walk zone (WZ), buffer zone (BZ), crosswalk (CW) and street (ST). The building edge is the section of the corridor lined by structures fronting the sidewalk. As in most cities, building edge use vary from mixed, commercial, residential, institutional, open space and other uses. Walk zone is the obstacle free zone where pedestrians walk. The walk zone varies in width and pavement quality depending on frontage use and maintenance. The vitality of the walkzone and diverse group of users also vary greatly. The buffer zone or furnishing zone separates the walk zone from the street. It is where trees, benches, street signs, mailboxes and other sidewalk amenities are installed. Crosswalks are usually located at both ends of the block to protect pedestrians from vehicular flow as they traverse from one sidewalk to another. The street adjacent the sidewalk is relevant to the extent it is used by food trucks or other sidewalk related activities. In some cases, bumpouts like parklettes or eateries are extended to the street.

Figure 3:
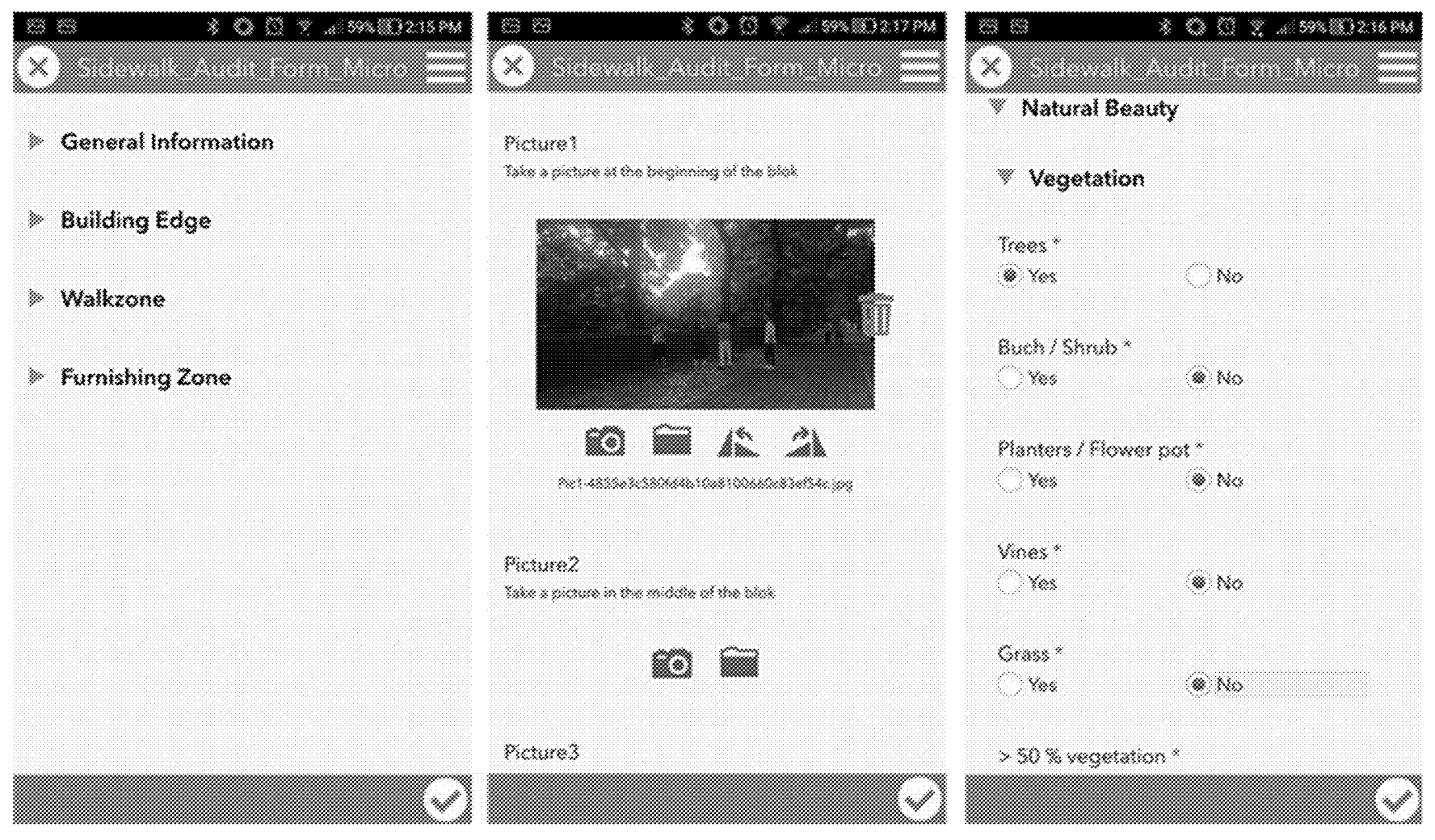

FIG. 3 Data collected from the 5 sections of the sidewalks are obtained through detailed walk surveillance/visual inventory technology. Available data collection software (e.g. object recognition technology) gather visual content, describe and label the physical attributes of sidewalks relevant to improving the walking experience. Visual inventory in an urban environment is akin to species identification in a highly complex tropical forest ecosystem. The field surveillance is conducted by trained assessors equipped with the custom electronic data collection tool supported by features like geotagging, fast field reporting, rapid data access, secure storage, and can be properly formatted in multiple formats and shapefiles. We refer to the unit of study as the pedestrian visual field. The visual field is that geographical area that is visible from a pedestrian location on any given block. It includes all surrounding points and sightline. It is the area where the building edge, the sidewalk, the street, and the pedestrians can all be seen at any given point in time. The visual field serves as control point. There are over 200 attributes listed in the microscale data system and macro ranges from 40 elements and upwards depending on the availability of information within a given environmental setting.

Figure 4:
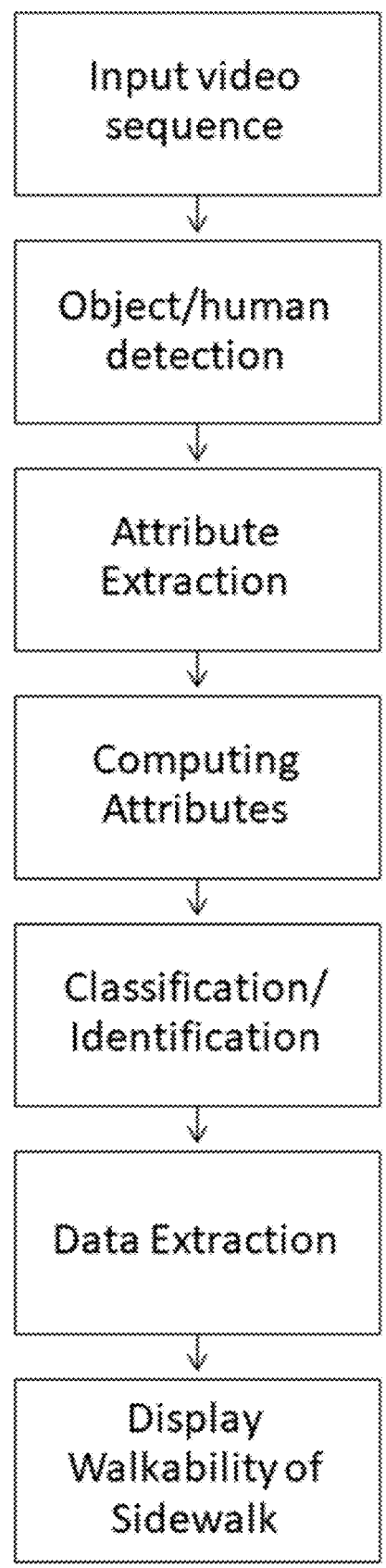
FIG. 4 shows the use of image analysis software to obtain sidewalk attributes through object based image recognition, pattern matching for objects and location, verification and quantification.

FIG. 4 Using an image analysis software, all sidewalk attributes are line scanned for imaging. The processing method uses object based image recognition, pattern matching for objects and location, verification and quantification. To realize the process, a portable accessory is attached to a smart camera. The object recognition accessory has features such as full set of shooting sidewalk attributes, an image gallery management, storage and processing.

Figure 5:
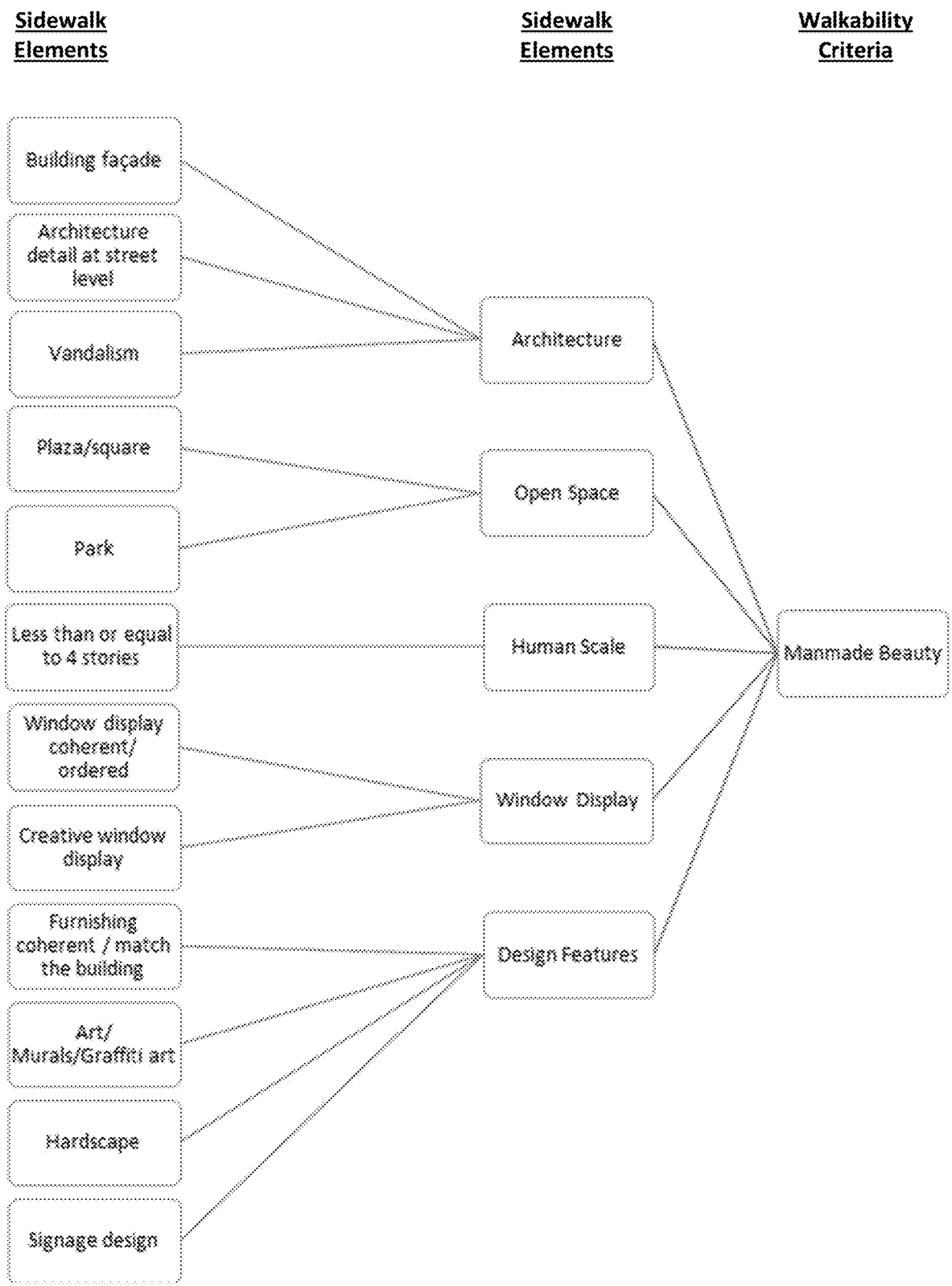
FIG. 5 illustrates one example of the grouping of sidewalk attributes into distinct elements and criteria.

FIG. 5 illustrates the grouping of sidewalk attributes into distinct elements. The distinct sidewalk elements are then associated with a walkability criterion. We present eleven walkability criteria in this invention. However, depending on the nature of cities or urban settings, the numbers of attributes, elements and walkability criteria will vary. The walkability criteria include:

Aesthetics—Intended for human delight and celebration of nature and place including natural and manmade Sidewalk Utility—The quality of the sidewalk or frontage being useful Safety—injury and violence free Comfort—a balance between stimulus and relaxation . . . the naturalness of motion Access—multimodal transport system access or connectivity Vibrance—the energy of space (includes human density and activity)

Interest—makes pedestrian space worth looking at

Legibility—sense of place or uniqueness of the place

Equity—absence of systematic disparity among children, the elderly and disabled individuals.

The walkability criteria make up the training set where hundreds of attributes are directed to any one of the walkability categories. In other words, attributes are trained to fall under any of the category. This population process allows the system to understand the levels of variety, diversity and complexity of a particular environmental setting. It is a way of creating the sidewalk taxonomy of any given place.

FIG. 5 is an example of how specific sidewalk attributes are trained to associate themselves to tangible sidewalk elements which in turn are directly associated to a specific walkability criterion. The diagram on FIG. 5, represents sidewalk attributes that are coherently linked to concrete elements along the sidewalk that in effect operationalizes man-made beauty as a distinct walkability dimension.

Figure 6A:
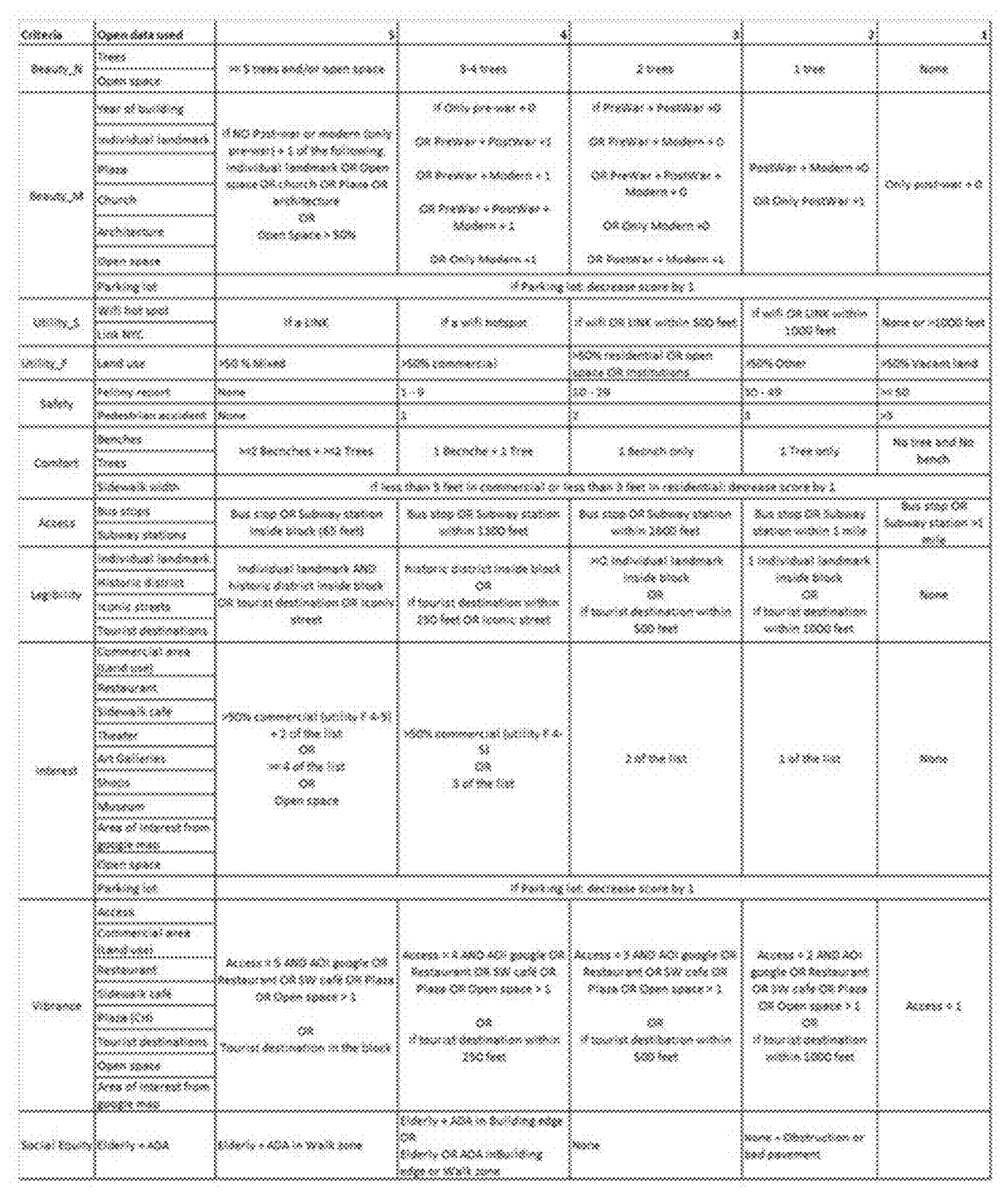
Figure 6B:
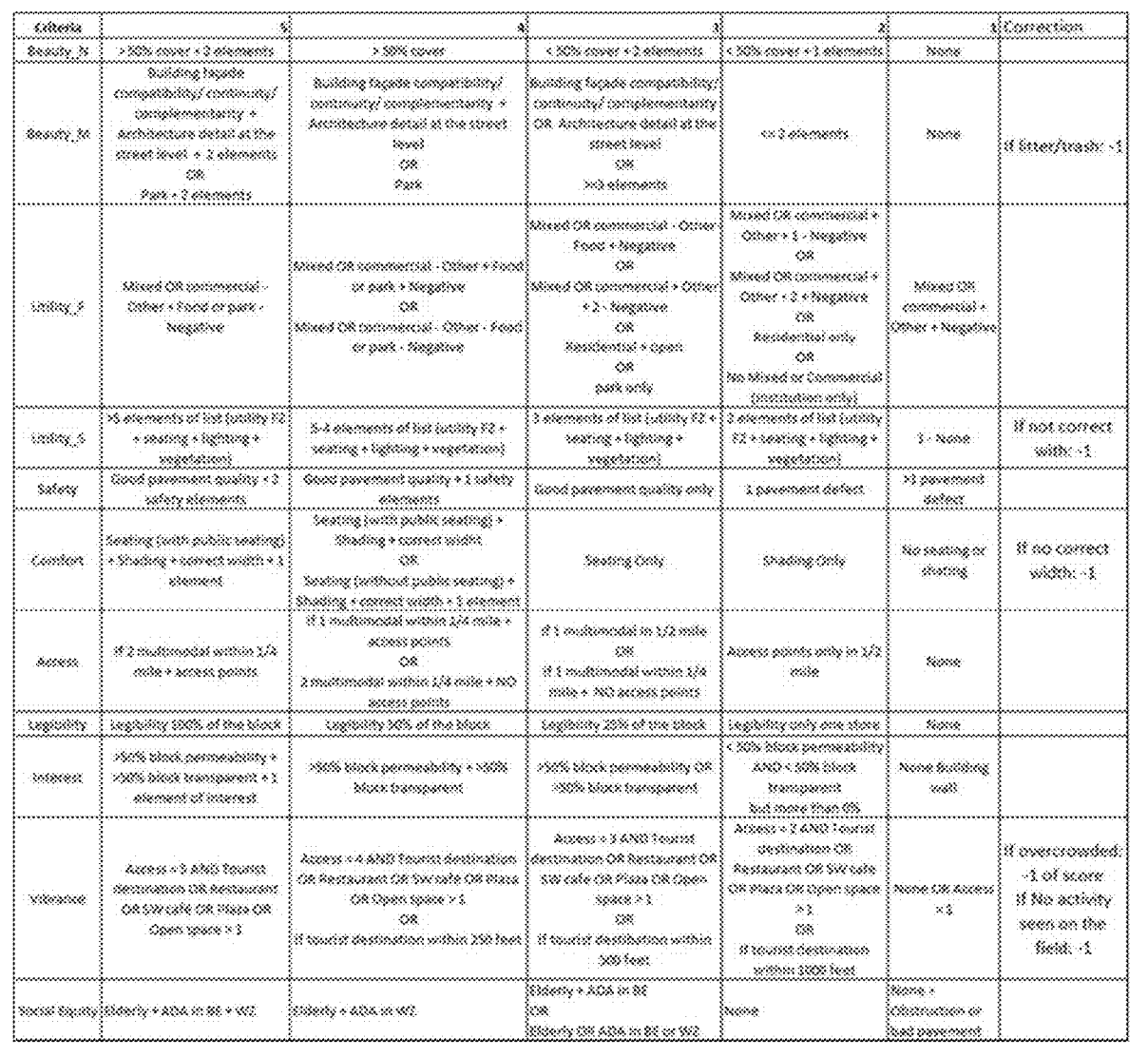

FIGS. 6a and 6b lay out the rule-based scoring system for microscale and macroscale data. The microscale system, for example, inputs over 200 attributes associated with 11 walkability criteria. The output values are walkability scores calculated by block, ¼ mile, neighborhood or specifically defined routes. Through this supervised learning algorithm, determining the degrees of walkability of sidewalks is achieved for all categories as well as the total value achieved by summing all categories and deriving the median score.

This method of evaluating walkability and assigning scores through a routine computing system can be applied to different cities. Total walkability is composed of, but not limited to, 11 criteria categories. A score of 1 to 5 is calculated for each criterion and applied on each section of the sidewalk. A value of 1 signifies low walkability and 5 means high walkability. This score is a function of many sidewalk elements depending on the criterion. A total score from 0 to 100% based on the sum of the criteria is also calculated and represents the percentage walkability of the sidewalk. The method allows us to add elements, modify the rules and methods.

Natural beauty=f (vegetation, water, landform)

Manmade beauty=f (building information and architecture, open space, human scale, window display, design elements)

Sidewalk utility=f (ease of movement, sidewalk amenities, sidewalk width, obstructions)

Frontage utility=f (land use, retail type, specialty store, food and drinks, open space, professional services, arts and entertainment, other and negative elements)

Safety=f (felony report, pavement quality, lighting, building condition, cameras and other surveillance measures)

Comfort=f (seating, shading and pet comfort)

Access=f (multi-modal public transportation, bicycles and parking)

Legibility=f (spatial uniqueness, sense of place, landmark, historic district, tourist destinations)

Interest=f (art and entertainment elements, open space, building edge permeability and transparency)

Vibrance=f (public transportation access, human activity, meeting place, tourist destinations)

Social Equity=f (ADA access, inclusive of children, elderly, adults, teens)

Figure 7:
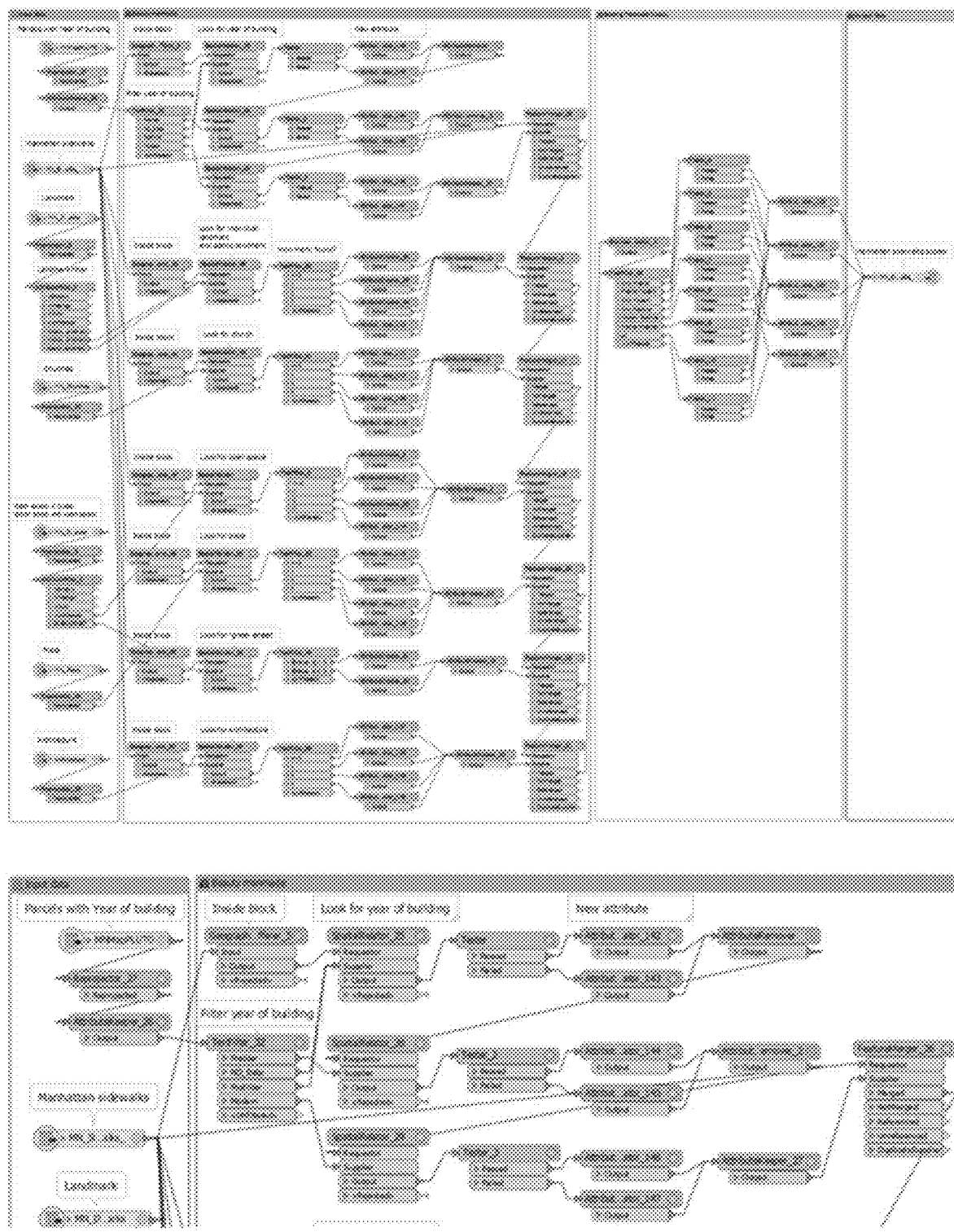
FIG. 7 is a sidewalk decision tree developed on a feature manipulation software.

FIG. 7 is a sidewalk decision tree developed on feature manipulation software. The example used is the category manmade beauty. The software automates the application of rules to attributes in order to define the degrees of walkability among sidewalks under study. The decision tree model facilitates sidewalk quality differentiation through a computerized rule-setting and scoring of the blocks. The system enables the understanding of sidewalk quality through visual clues and elements otherwise not previously classified. During this phase, the dataset is trained using specific rules that result in multiple numerical scores assigned to each block and presented to users through a user interface engine. It is a powerful data analysis system that recognizes and transforms input data to assign degrees of sidewalk quality. Walking preferences are modeled through a set of criteria that together objectively defines sidewalk quality and operationalizes walkability.

Figure 8:
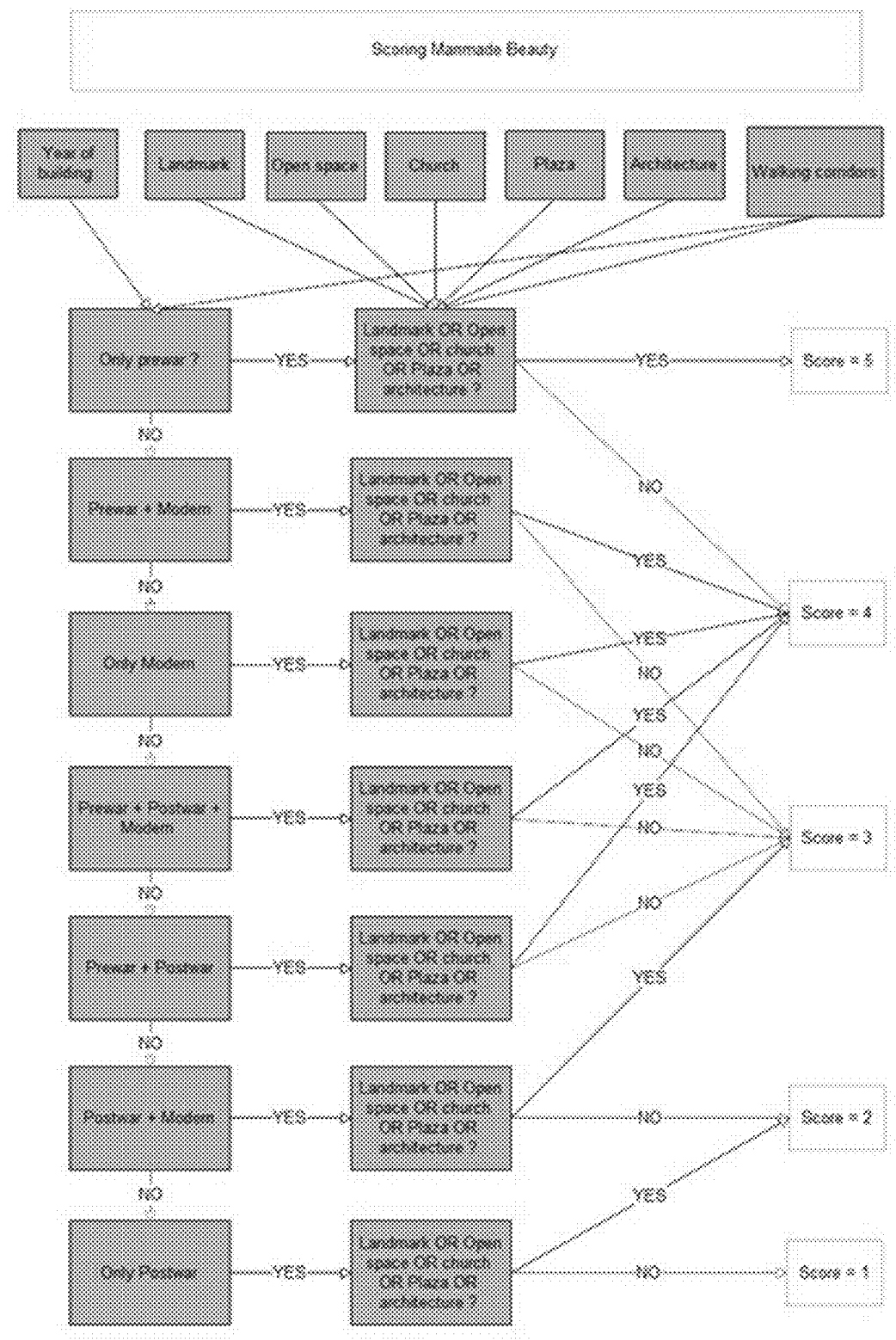
FIG. 8 shows a simplified decision tree diagram that illustrates the applied rule-based scoring system for the criterion manmade beauty.

FIG. 8 shows a simplified decision tree diagram that illustrates the applied rule-based scoring system. For example, scoring manmade beauty will use attributes such as construction period, presence of historic or cultural landmarks, open space and architectural details. A particular block is assigned a high score if it meets all the requirements. The lesser manmade attributes there are, the lower the score.

Figure 9A:
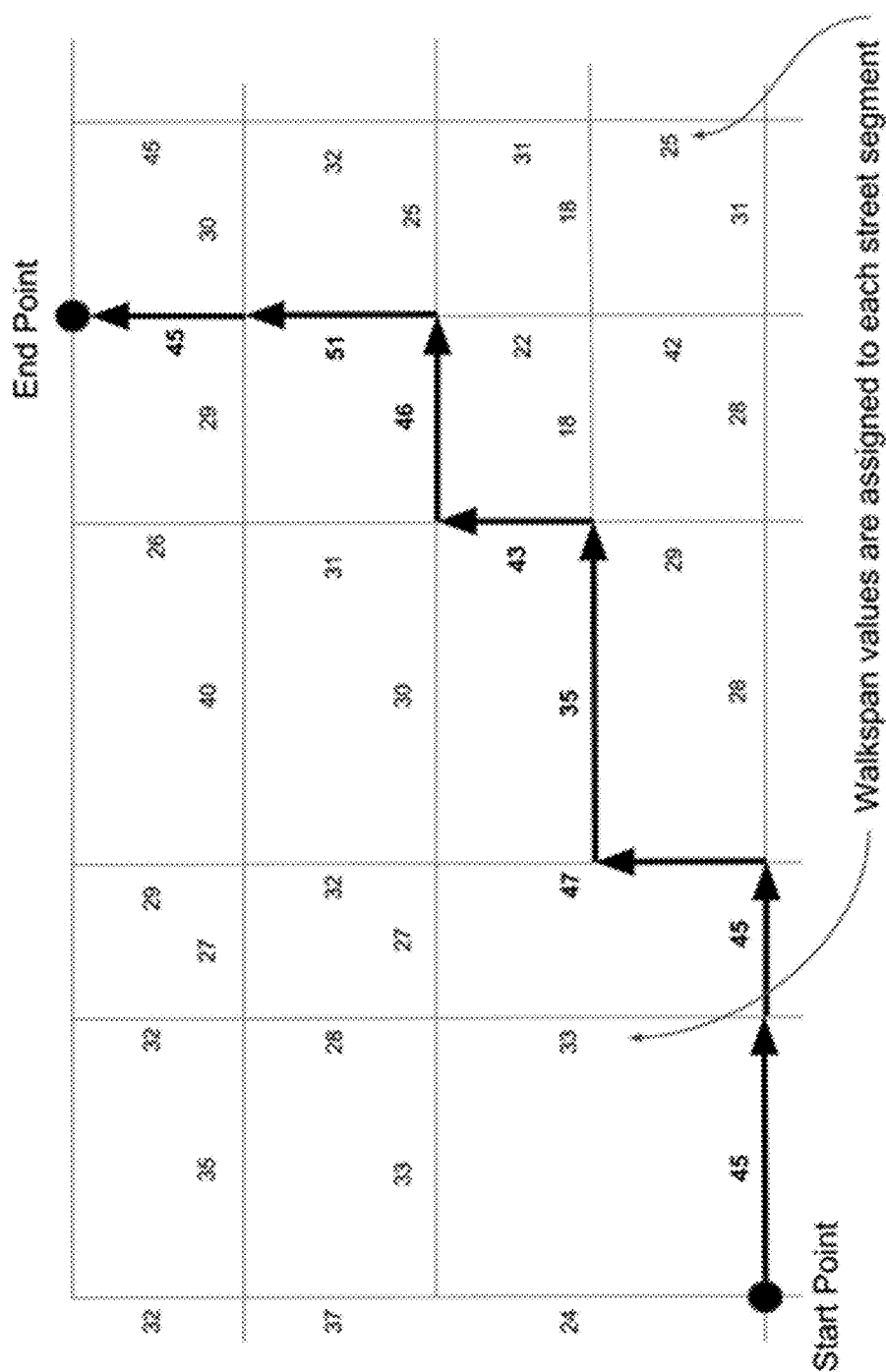
FIGS. 9a and 9b illustrate how walkability values are assigned to each segment or block to identify routes with the highest walkability score using a data algorithm.
Figure 9B:
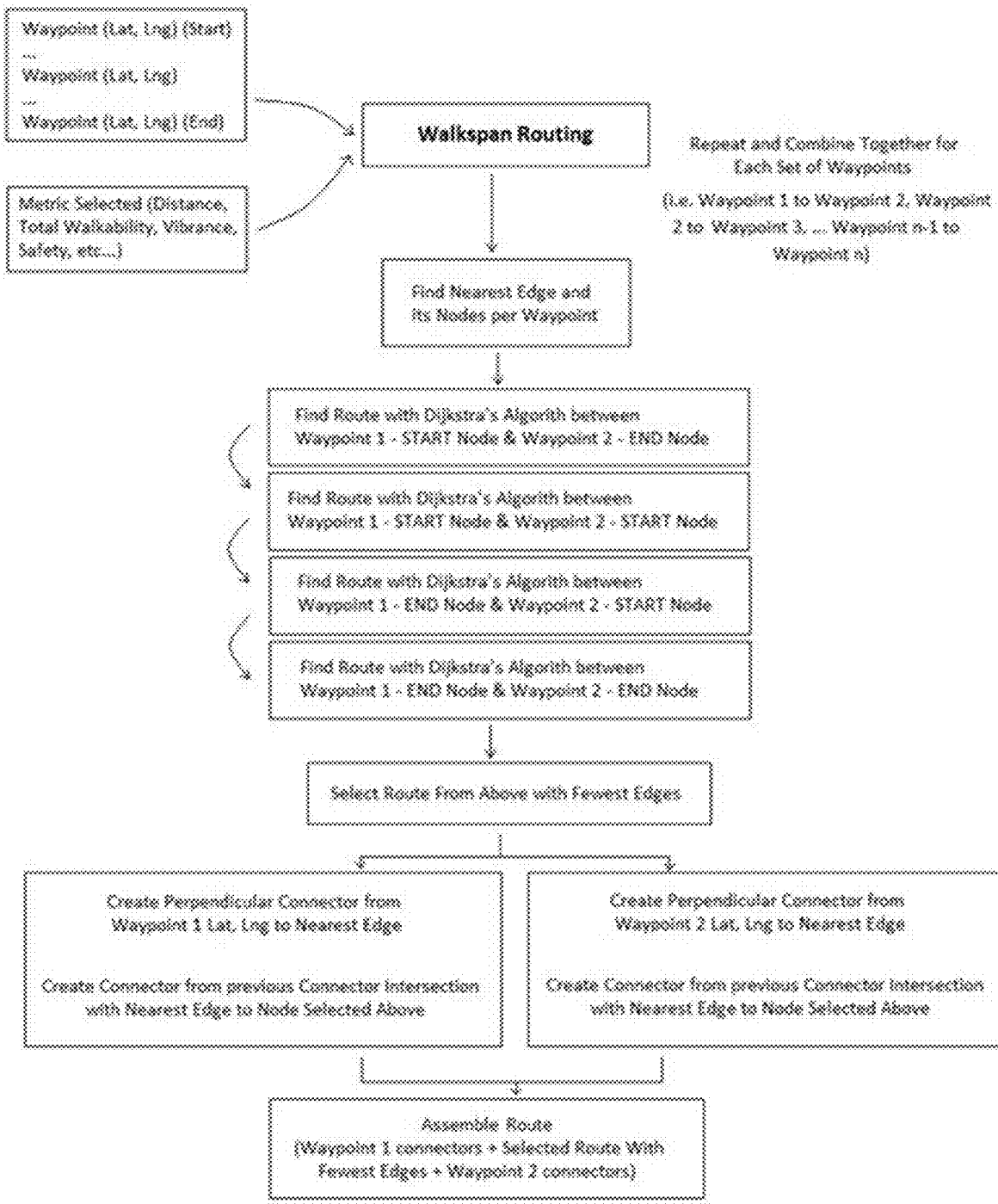

FIGS. 9a and 9b illustrate how walkability values are assigned to each segment or block to identify the route with the highest walkability score. The navigation algorithm can delineate on a map the most walkable route (total score) OR a tree-lined route (highest beauty score) OR a vibrant route with plenty of cafes and restaurants for the users to select from (highest vibrant score).

The routing process depends on an existing network topology where edges (streets), start, and end vertices for edges, and respective edge values for the metrics have been computed and are available.

Integrating routing with our walking assessment data was achieved using a routing process that takes as inputs a series of waypoints (minimum two—start and end) and a metric (distance, total walkability, vibrance, etc.) and determines the route with the highest value based on the metric selected. The waypoints, as well as the metric are user picked and can be re-inputted to calculate a different route. The best value means that for distance, a shorter route has higher value, whereas for all the other metrics (total walkability, natural beauty, manmade beauty, sidewalk utility, frontage utility, comfort, vibrance, interest, legibility, safety, and access) have inverse value compared to distance, i.e. the larger the metrics the higher the value.

To determine the best route, once a start, end waypoint and a metric are provided, the nearest edges to the waypoint are found. The two sets of two vertices, or nodes that make up these near street edge segments are then used as inputs into the Dijkstra algorithm (along with the distance or selected metric as costs) in every possible combination (start—start, start—end, end—start, end—end). The Dijkstra algorithm, used to compute the shortest path in a network of graph nodes, then finds which of these 4 possible path combinations is the shortest and thus will serve as the center part of the route. To connect the route to the user-specified start and end waypoints, connector segments are calculated by first drawing a perpendicular segment from the waypoint to the nearest edge, then from that point to one of the two end nodes on that edge. We know which end point this is because it was found in the previous step where the shortest Dijkstra path out of the 4 possible paths was determined.

The connector segments and the shortest found Dijkstra path are then combined as the full route. For more than 2 waypoints, the route is created by simply repeating the process above for the sequence of waypoints, i.e. Waypoint 1 to Waypoint 2, Waypoint 2 to Waypoint 3, . . . , Waypoint n−1 to Waypoint n.

Figure 10:
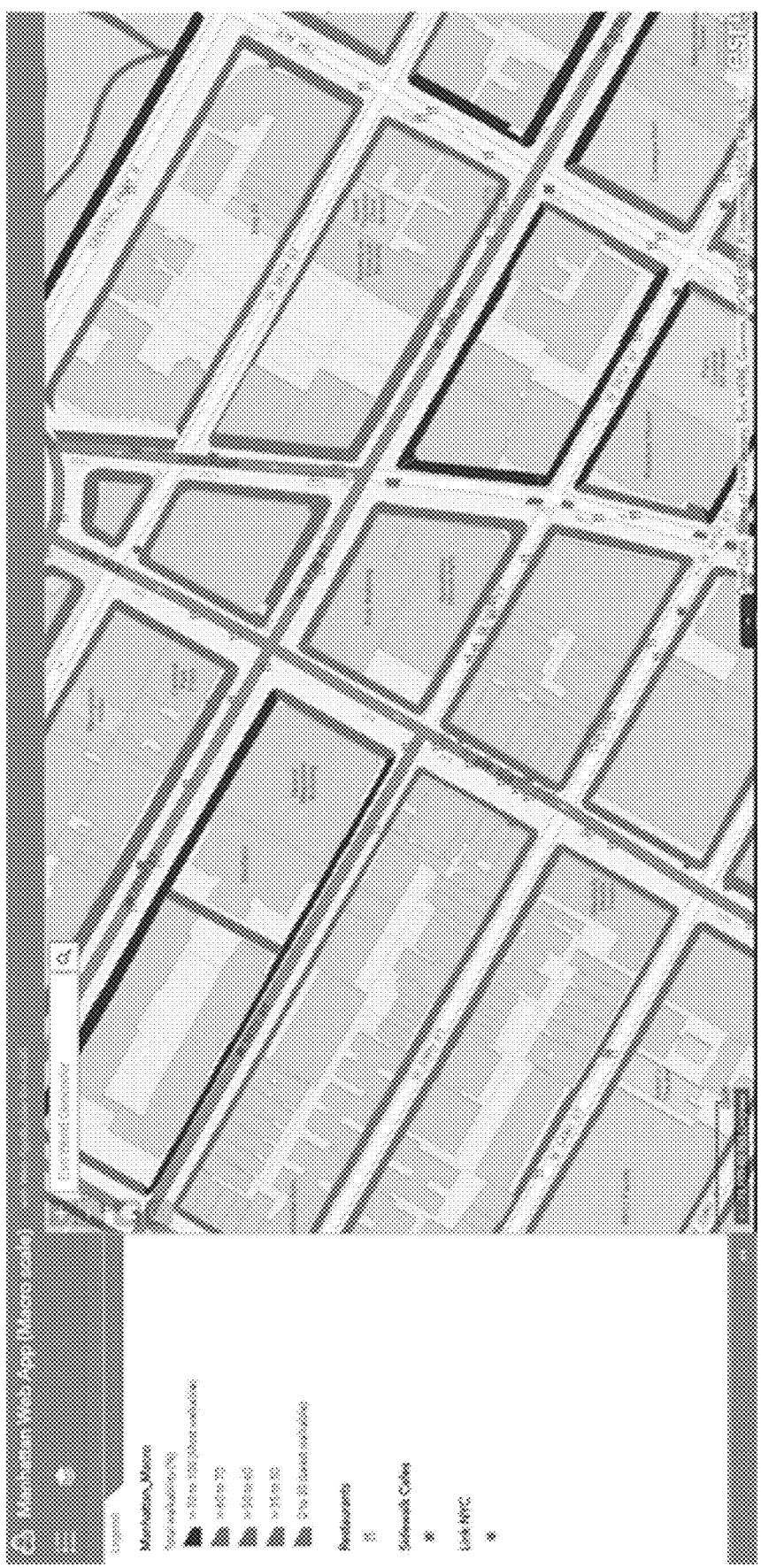
FIG. 10 represents the user interface diagram illustrating how information is provided to users via a webviewer.
Figure 11:
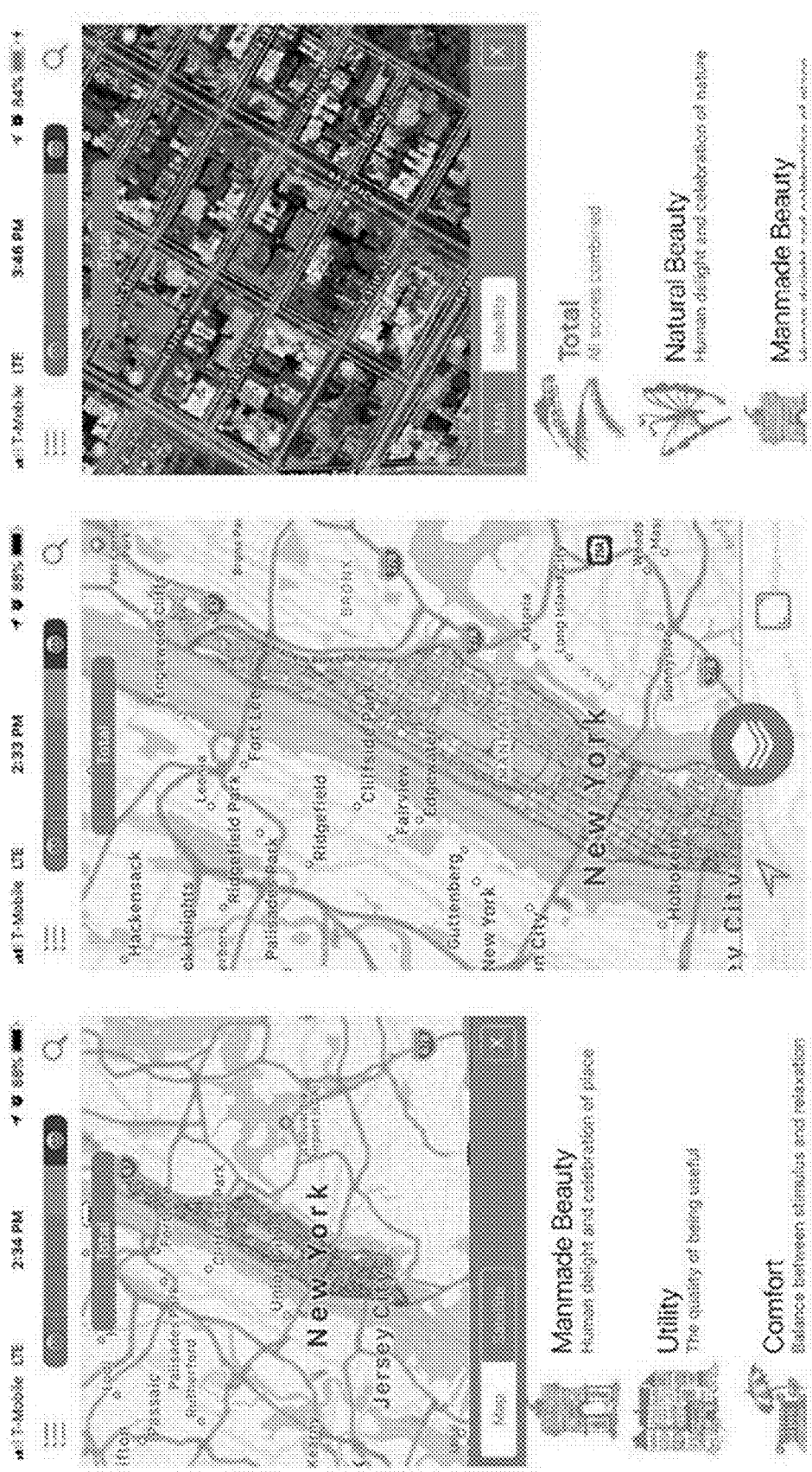
FIG. 11 illustrates a way of providing and selecting the walking environment people want through an App.

FIGS. 10 and 11 represent the user interface diagram illustrating how the information derived from machine learning is provided to users through an App that uses both iOS and Android mapping frameworks. Parsing and conversion of walkability data into a usable in-app object structure was developed for layout and flow. The principal output is a plurality of maps and visuals for multiple and multisector applications that display and/or delineate recommended sidewalks and routes for pedestrians. Maps generated through geographic information systems are designed and displayed to enrich the experience of urban pedestrians by directing them to streets that meet their desired criteria for walking. These new information is incorporated in a useful web based and mobile applications that will highlight preferred routes based on a host of walkability factors.

The user interface accommodates real estate search through overlays, navigation from point of origin to destination, fitness by selection of preferred walking route, planning by highlighting place making opportunities and curated walking by defining the best walking route given multiple destinations at a given stretch of time.

FIG. 11 illustrates a way of providing the walking environment people want with direct impacts on property search, navigation, health and environmental planning. It shows how the App user interface allows the user to see what sidewalks are more walkable than others. Upon launching the app, the screen shows a map of your location and the surrounding area. By default, the Total Walkability layer is the overlay shown. The top of the screen shows the color scale, red being the least walkable and green being the most walkable. Users have the option to apply a different layer from the list of the criteria overlays, view walkability in different neighborhoods, or search for a location. Using the overlay previously chosen, the user can determine the best route to take to their destination.

Figure 12:
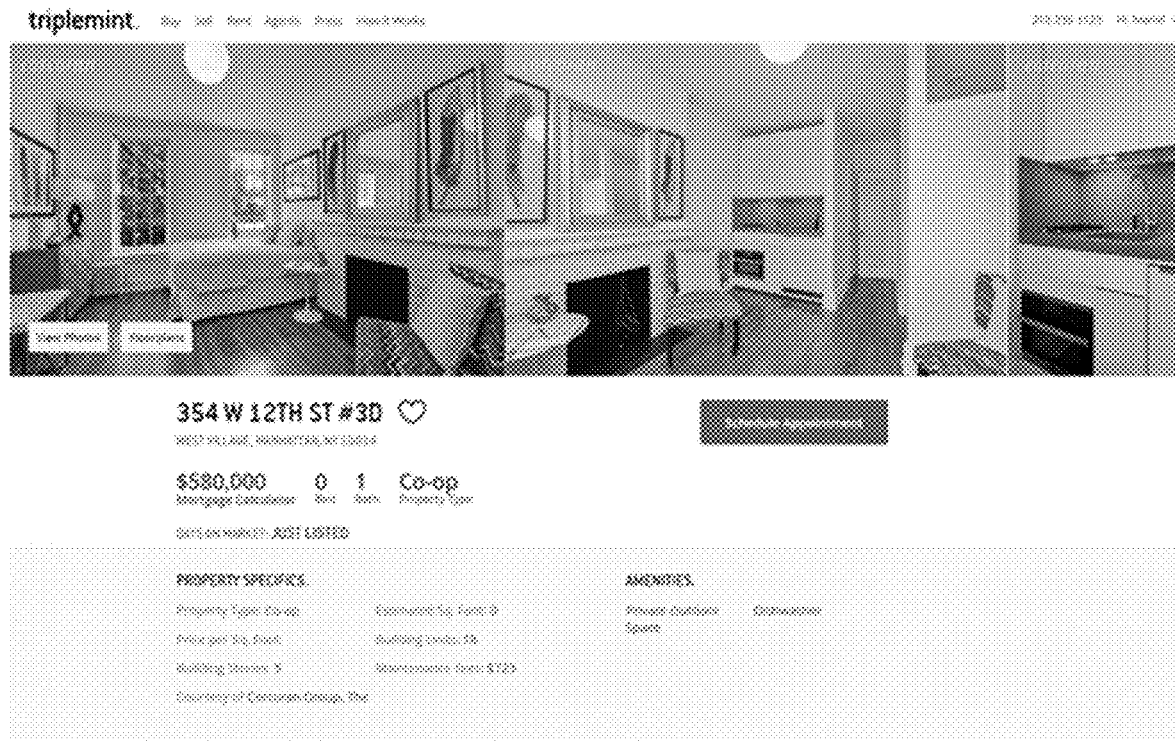
FIG. 12 illustrates a simulated real estate property search with a superimposed map that defines the quality of the surrounding sidewalks measured at block, ¼ mile and neighborhood scales.
Figure 12:
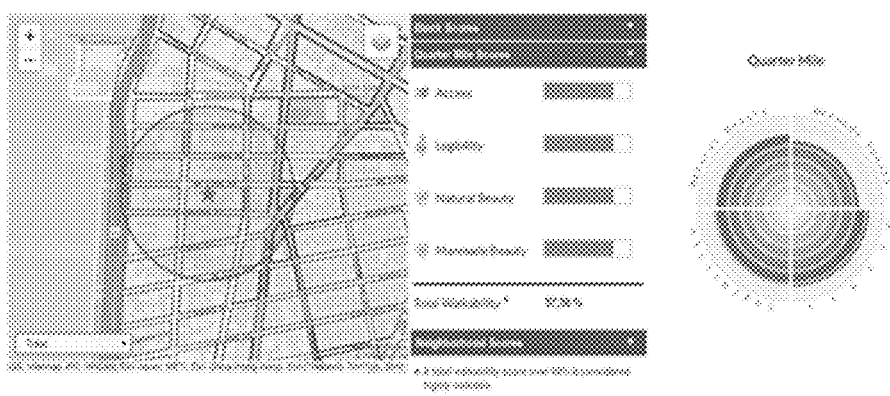

FIG. 12 illustrates a simulated real estate property search for purchase or rent that can avail of a superimposed map that defines the quality of the surrounding sidewalks. Typical searches allow for filters to narrow choices by location, price, size of home or apartment. To this, one can add a color-coded map that adds walkability information to the results that the search generates. The screen illustrates a search example that adds total walkability map displaying most to least walkable. Other search options are available for 11 other criteria such as natural beauty (number of trees), manmade beauty (architecture), vibrance (mix-use building edge frontage) and so on. The discerning buyer or renter becomes more empowered in deciding their choice of home because walkability preferences are added to their selection criteria.

The search starts by indicating a desired neighborhood or a specific street address; once shown on the screen, one can select total walkability of the surrounding sidewalks in order to display the color-coded walkability map. To refine the walkability search a drop down menu will provide a list of sidewalk quality classified according to the 11 criteria earlier mentioned. Walkability values can be searched at block, ¼ mile, ½ mile and neighborhood scales.

Figure 13A:
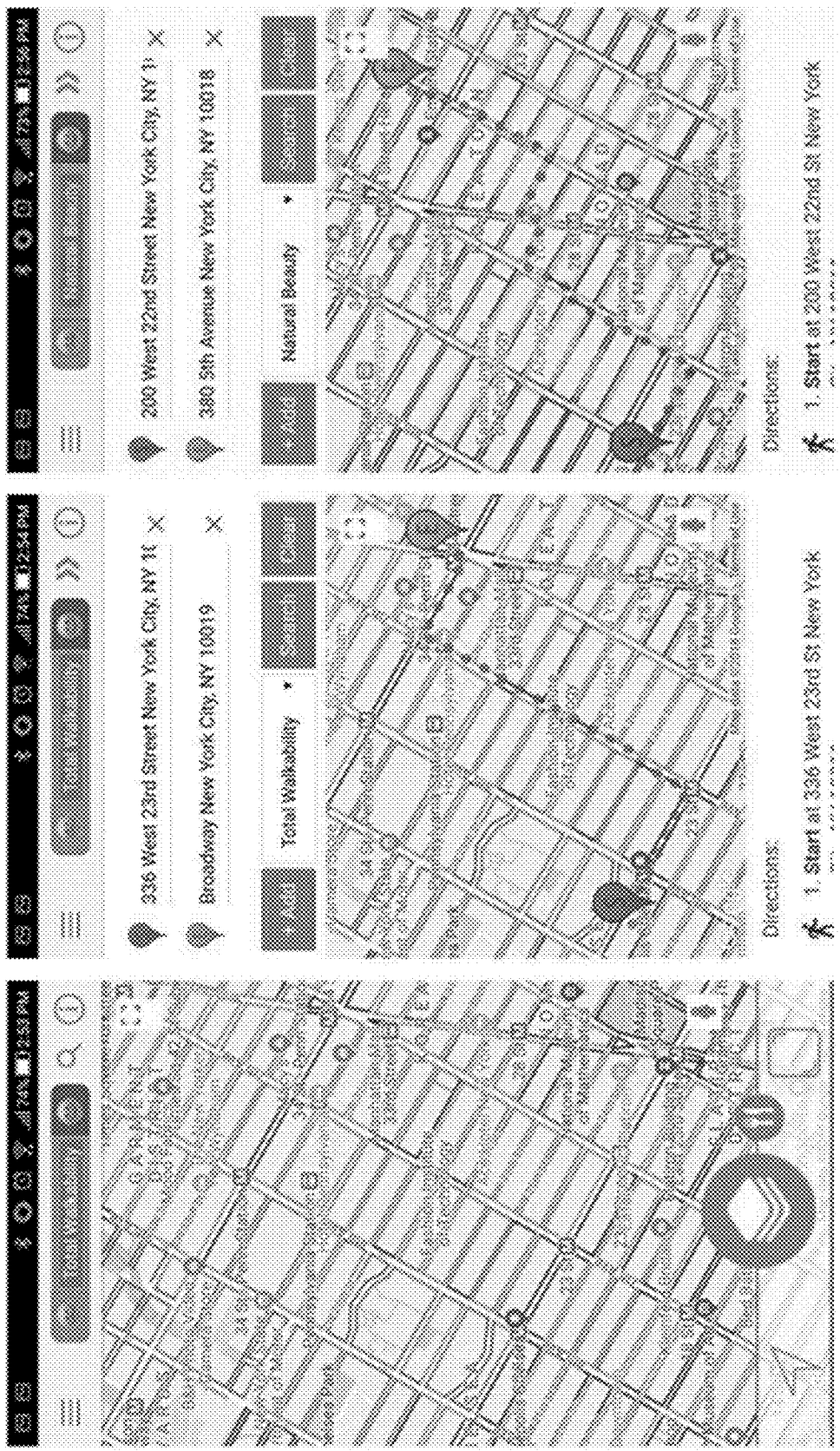
FIGS. 13a and b show routing and navigation App developed through a data algorithm to map a route that enhances the quality of the walk.
Figure 13B:

FIGS. 13a and 13b. As in Google search to find the shortest route from Point A to B, the walking recommendation system provides routing through a routing algorithm sensitive to walking assessment scores to map a route that enhances the quality of the walk. A drop-down menu that lists the options for sidewalk character and quality is given so the user can select the preferred type of walking environment (i.e. tree lined, vibrant, high access, etc.). Walking recommendations are likewise displayed on large wayfinding monitors for ease of access.

Figure 14:
FIG. 14 illustrates a simulated walking route based on a preferred pedestrian environment for fitness and health.

FIG. 14 illustrates a customized walking route based on a preferred pedestrian environment. Health advocates are aware of the importance of walking in improving healthy metabolism and in reducing weight. We have seen an avalanche of walking Apps and wearables during the past five years. Yet, the question about where to walk continue to emerge. There is limited information offered to Fitbit users, for example, about the quality of the walking environment. This invention facilitates routing preferred walks (with trees, no crowd, lots of cafes) so that the individual not only will lose weight but have a higher quality of walking experience.

Figure 15:
FIG. 15 illustrates use of machine learning to translate sidewalk blocks with low values of 1 and 2 as opportunities for place-making, urban design and planning.

FIG. 15 The output generated through machine learning can translate sidewalk blocks with low values of 1 and 2 as opportunities for placemaking. This information serves as available and useful data for urban planning, urban design and placemaking. In FIG. 15 we illustrate all sidewalk blocks that have low values for the walkability category Comfort meaning there is substantial lack of shading, seating, water fountain and other comfort amenities make walking and resting difficult. Planners and involved community residents can take the information and use as springboard to improve their walking environment.

Figure 16:
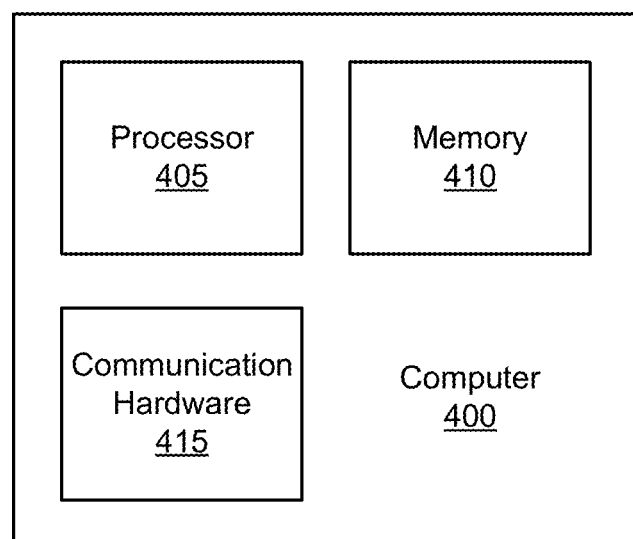
FIG. 16 is a schematic block diagram illustrating one embodiment of a computer.

FIG. 16 illustrates one embodiment of a computer 400. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may include a display and an input device for communication with the user.

Figure 17:
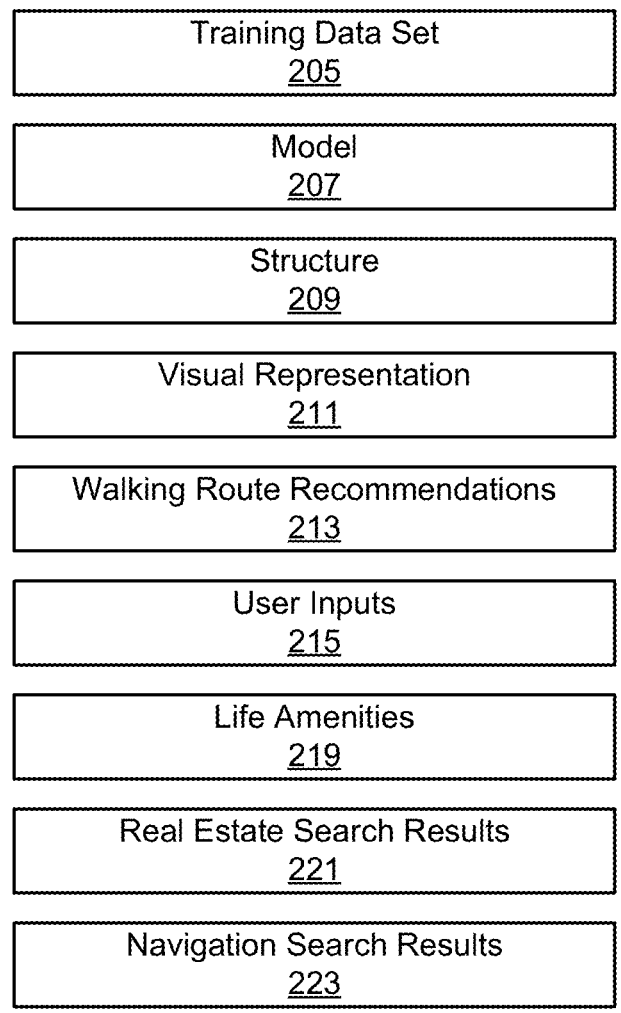
FIG. 17 is a schematic block diagram illustrating one embodiment of system data.

FIG. 17 is a schematic block diagram illustrating one embodiment of system data. The system data may be organized as a data structure in a memory. In the depicted embodiment, the system data includes a training data set 205, a model 207, a structure 209, a visual representation 211, walking route recommendations 213, user inputs 215, life amenities 219, real estate search results 221, and navigation results for best walkable routes 223. Images and data collected from object recognition and electronic data collection software comprise the training data set 205. The model 207 comprises the walkability criteria that serves to classify data. The structure 209 allows for analyses and a system for scoring the sidewalks or pedestrian flow zones based on the selected criteria. Visual representation 211 of the mapping system is channeled through webviewers and mobile Apps. The visual representations 211 and walking route recommendations 213 (fulfilled through the scoring system) are designed for selected client groups such as but not limited to: a) groups seeking quality routes (not shortest) to get from origin to destination, b) groups seeking quality sidewalks (not access to shops, etc.) in their property search, c) groups seeking for criteria based routes for fitness, d) groups (tourists and residents) determining whether full list of quality of life amenities are at block, radial or neighborhood scales. User inputs 215 are received through user data query mechanisms and crowdsourcing.

Figure 18:
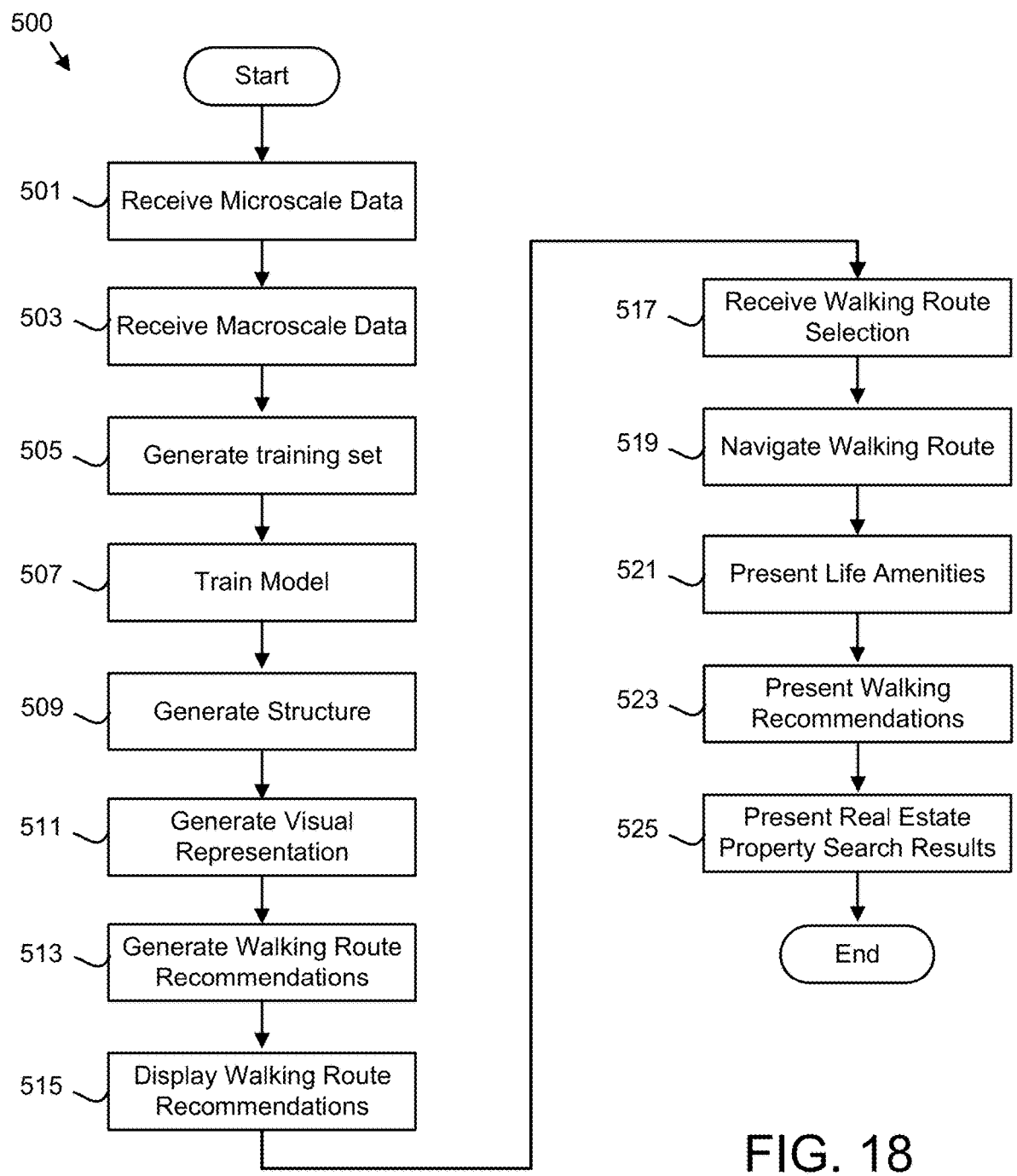
FIG. 18 is a schematic flow chart diagram illustrating one embodiment of a walking route generation method.

FIG. 18 is a schematic flow chart diagram illustrating one embodiment of a walking route generation method 500. The method 500 may generate and present walking route recommendations. The method 500 may be performed by a processor 405.

The method 500 starts, and in one embodiment, the processor 405 receives 501 microscale data 201 comprising a visual audit using custom designed electronic field forms and protocols and object recognition of images.

The processor 405 may receive 503 macroscale data 203 comprising one or more of collected data, mined data, and scrapped data. In addition, the processor 405 may generate 505 a training data set 205 from the microscale data and the macroscale data that facilitates the classification of sidewalks and pedestrian flow zones for user extraction, the training set comprising an input feature representation for walkability through the identification of the hierarchy sidewalk and pedestrian flowzone information.

The processor 405 may train 507 the model 207 based on the training data set 205. The processor 405 may further generate 509 the structure 209 of a learned function through decision trees and rule-based scoring system for scoring of identified attributes. The microscale data are the attributes identified along sections (building edge, walk zone, buffer of furnishing zone, street and crosswalk) of the sidewalk and other pedestrian flow zones. These attributes are trained by classification into the walkability model. For example, a range of approximately 200 attributes can be labled and classified into 11 point criteria of the walkability model after which are scored based on a rule-based system in order to produce new data (output) about the quality of the sidewalks or other pedestrian flow zones. Attributes suggesting natural beauty like trees, bushes, flower pots, water, gardens are trained to fall under the natural beauty criteria of the walkability model. These input data are analyzed and scored to generate new data on walkability based on natural beauty where the scoring ranges from 1 to 5 with 1 being least walkable and 5 most walkable.

In one embodiment, the processor 405 generates 511 the visual representation 211 of the microscale data 201 and macroscale data 203.

The processor 405 generates 513 walking route recommendations 213. The walking route recommendations 213 may be a limited set of walking route recommendations 213. The limitation of the walking route recommendations summarizes the best walking route recommendations 213, simplifying the selection of a walking route for the user. Recommended routes are defined from point of origin to destination. Recommended routes are classified by criteria that constitute the walkability model. Another way to call the process is preferential mapping, where, depending on factors that meet the user's criteria for walking, routes are displayed and color coded. The user can choose the best route where natural beauty is dominant or the best route where sidewalks are vibrant and lined with shops and restaurants or comfort routes where shading and availability of benches prevail. In other words, the shortest route is not the route sought but quality routes representing new information on walkability that enhance their decision to walk, although still well within the distance range of the shortest route, to ensure practicality of the recommended route. Recommended routes rely on the scoring system applied to every block.

The processor 405 may display 515 the limited set of walking route recommendations 213 and the visual representation 211. Each of the limited set of walking route recommendations 213 may be selectable to launch navigation of a walking route. The walking routes may be unlaunched while the limited set of walking route recommendations 213 are displayed. The limited set of walking route recommendations 213 may be displayed 515 as one or more of a visual navigation and a screen and an audio navigation.

The processor 405 may receive 517 a walking route selection. In one embodiment, the processor 405 navigates 519 the selected walking route. The processor 405 may provide visual and/or audio directions to the user. In addition, the processor 405 may indicate the user's current location on the walking route. As in most mapping applications, the user's current location is provided and the walking recommendation selection can be explicitly requested thereby operationalizing walkability according to the many criteria that make up the walkability model such as but not limited to, natural beauty, manmade beauty, frontage utility, sidewalk utility, safety, comfort, access or connectivity, vibrance by density or activity, interest, legibility and social equity.

In one embodiment, the processor 405 presents 521 one or more life amenities 219 within designated distances of the walking route. Quality of life amenities is a collection of functional features of the urban environment that contribute to an individual's sense of well-being. Selection could include a nearby café, a hardware, a row of trees, a pharmacy, a bakery, a park etc. In addition, the processor 405 may present 523 walking recommendations 213 superimposed on maps to recommend properties surrounded by higher quality sidewalks displayed at block, radius, neighborhood and citywide scales. In a certain embodiment, the processor 405 presents 525 simulated real estate property search results 221 on a superimposed map that defines a quality of surrounding sidewalks. Similar or same output data derived from machine learning model are used in real estate search through an API that allows a user to determine the walkability of a location to enter an address or a series of addresses in order to receive visual representations of the degrees of walkability of the preferred properties. The walkability model becomes another differentiator in property searches. Neighborhood walkability is measured using the same scoring system applied to all models.

The finalized combined model is responsible for operationalizing walkability through a scoring system assigned to every block and for all the walkability criteria. The same scoring system is used across all applications for a diverse set of client groups.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
receiving, by use of a processor, microscale data comprising walkability criteria comprising natural beauty, manmade beauty, sidewalk utility, frontage utility, safety, comfort, access, vibrance, interest, legibility, and social equity, wherein the natural beauty, the manmade beauty, the sidewalk utility, the frontage utility, the safety, the comfort, the access, the vibrance, the interest, the legibility, and the social equity each comprise a score, and object recognition of images to identify a walk zone, a buffer zone that separates the walk zone from a street, and a building edge zone, wherein the walk zone comprises an obstacle free zone where pedestrians walk and the buffer zone comprises furniture, trees, benches, street signs, and mailboxes that separate the walk zone from a street;

receiving macroscale data comprising one or more of collected data, mined data, and scrapped data;

generating a training data set from the microscale data and the macroscale data that facilitates the classification of sidewalks and pedestrian flow zones for user extraction, the training set comprising an input feature representation for walkability through the identification of the hierarchy sidewalk and pedestrian flowzone information;

training a model based on the training data set;

generating a structure of a learned function through decision trees and rule-based scoring system for scoring of identified attributes;

generating a visual representation of the microscale data and macroscale data;

generating a limited set of walking route recommendations based on user inputs to the model and the structure; and displaying the limited set of walking route recommendations and the visual representation.

2. The method of claim 1, the method displaying the limited set of walking route recommendations as one or more of a visual navigation in a screen and an audio navigation.

3. The method of claim 1, wherein the object recognition comprises the steps of receiving an input video sequence, object detection, attribute extraction and computing, identification, classification and scoring, data extraction for display and operationalization of walkability through a presentation and mapping technology, wherein operationalization comprises identifying physical elements, analyzing, classifying and extracting new information about degrees of walkability.

4. The method of claim 1, wherein the limited set of walking route recommendations are presented on one of a wearable sports tracking device, a web application, and a mobile app.

5. The method of claim 1, wherein the walkzone, buffer zone, furnishing zone, and building edge zone are identified using one of supervised machine learning and unsupervised machine learning.

6. The method of claim 1, wherein the walking route recommendations are weighted to environments that comprise sidewalks, pedestrian flow zones, pedestrian corridors, open space, plazas, pedestrian alleys and paths.

7. The method of claim 1, wherein the user inputs comprise target destinations with corresponding target times and the walking route recommendations comprises each target destination at the corresponding time.

8. The method of claim 1, wherein the macroscale data comprises life amenities and the life amenities are scored for each walking recommend based on distances from each walking recommendation and pedestrian flow zone attributes are geographically, spatially and time specific and/or time dependent.

9. The method of claim 8, the method further presenting one or more life amenities within designated distances of the walking route.

10. The method of claim 1, the method further presenting the walking recommendations superimposed on maps to recommend properties surrounded by higher quality sidewalks displayed at block, radius, neighborhood and citywide scales.

11. The method of claim 1, wherein the structure analyzes weather, traffic, events, geography, urban fabric and design, culture and socio-economic profile of location understudy.

12. The method of claim 1, wherein the user inputs comprise one or more of an origin, a destination, walking criteria, a maximum radius, a neighborhood, life amenities, property selection, a selection of turn by turn navigation for preferred walkability dimension, a selection of microscale data and macroscale data to suit user walking preferences, and a user profile.

13. The method of claim 1, the method further presenting simulated real estate property search results on a superimposed map that defines a quality of surrounding sidewalks.

14. The method of claim 1, wherein:

the natural beauty is calculated as a maximum score in response to greater than 50 percent vegetation cover and two elements of water and/or landform;

the manmade beauty is calculated as the maximum score in response to building facade compatibility, architecture detail at street level and 2 design elements or a park and 2 design elements;

the sidewalk utility is calculated as the maximum score in response to more than 5 utility elements comprising ease of movement, seating, sidewalk amenities, lighting, sidewalk width, obstructions, and vegetation;

the frontage utility is calculated as the maximum score in response to mixed or commercial use, the commercial use comprising food, retail, and specialty stores;

the safety is calculated as the maximum score in response to good pavement quality and 2 safety elements selected from felony reports, lighting, building condition, and cameras;

the comfort is calculated as the maximum score in response to seating, shade, a correct width, and one comfort element comprising pet comfort;

the access is calculated as the maximum score in response to 2 multi-modal public transportation options being within a quarter mile and one transportation element comprising bicycles and parking;

the vibrance is calculated as the maximum score in response to the access being the maximum score and one of a tourist destination, a restaurant, a sidewalk café, a plaza, and an open space;

the interest is calculated as the maximum score in response to greater than 50 percent block permeability, greater than 50 percent block transparency, and one element of interest;

the legibility is calculated as the maximum score in response to 100 percent spatial uniqueness, sense of place, landmark, historic district, and/or tourist destination; and the social equity is calculated as the maximum score in response to American with Disabilities Act (ADA) access and inclusiveness of children, elderly, adults, and teens.

15. An apparatus comprising:

a processor;

a memory storing code executable by the processor to perform:

receiving microscale data comprising walkability criteria comprising natural beauty, manmade beauty, sidewalk utility, frontage utility, safety, comfort, access, vibrance, interest, legibility, and social equity, wherein the natural beauty, the manmade beauty, the sidewalk utility, the frontage utility, the safety, the comfort, the access, the vibrance, the interest, the legibility, and the social equity each comprise a score, and object recognition of images to identify a walk zone, a buffer zone that separates the walk zone from a street, and a building edge zone, wherein the walk zone comprises an obstacle free zone where pedestrians walk and the buffer zone comprises furniture, trees, benches, street signs, and mailboxes that separate the walk zone from a street;

receiving macroscale data comprising one or more of collected data, mined data, and scrapped data;

generating a training set from the microscale data and the macroscale data that facilitates the classification of sidewalks and pedestrian flow zones for user extraction, the training set comprising an input feature representation for walkability through the identification of the hierarchy sidewalk and pedestrian flowzone information;

training a model based on the training data set;

generating a structure of a learned function through decision trees and rule-based scoring system for scoring of identified attributes;

generating a visual representation of the microscale data and macroscale data;

generating a limited set of walking route recommendations based on user inputs to the model and the structure; and presenting the limited set of walking route recommendations and the visual representation.

16. A computer program product comprising a non-transitory computer readable storage medium storing code executable by a processor to perform:

receiving microscale data comprising walkability criteria comprising natural beauty, manmade beauty, sidewalk utility, frontage utility, safety, comfort, access, vibrance, interest, legibility, and social equity, wherein the natural beauty, the manmade beauty, the sidewalk utility, the frontage utility, the safety, the comfort, the access, the vibrance, the interest, the legibility, and the social equity each comprise a score, and object recognition of images to identify a walk zone, a buffer zone that separates the walk zone from a street, and a building edge zone, wherein the walk zone comprises an obstacle free zone where pedestrians walk and the buffer zone comprises furniture, trees, benches, street signs, and mailboxes that separate the walk zone from a street;

receiving macroscale data comprising one or more of collected data, mined data, and scrapped data;

generating a training set from the microscale data and the macroscale data that facilitates the classification of sidewalks and pedestrian flow zones for user extraction, the training set comprising an input feature representation for walkability through the identification of the hierarchy sidewalk and pedestrian flowzone information;

training a model based on the training data set;

generating a structure of a learned function through decision trees and rule-based scoring system for scoring of identified attributes;

generating a visual representation of the microscale data and macroscale data;

generating a limited set of walking route recommendations based on user inputs to the model and the structure; and presenting the limited set of walking route recommendations and the visual representation.

17. The apparatus of claim 15:

the natural beauty is calculated as a maximum score in response to greater than 50 percent vegetation cover and two elements of water and/or landform;

the manmade beauty is calculated as the maximum score in response to building facade compatibility, architecture detail at street level and 2 design elements or a park and 2 design elements;

the sidewalk utility is calculated as the maximum score in response to more than 5 utility elements comprising ease of movement, seating, sidewalk amenities, lighting, sidewalk width, obstructions, and vegetation;

the frontage utility is calculated as the maximum score in response to mixed or commercial use, the commercial use comprising food, retail, and specialty stores;

the safety is calculated as the maximum score in response to good pavement quality and 2 safety elements selected from felony reports, lighting, building condition, and cameras;

the comfort is calculated as the maximum score in response to seating, shade, a correct width, and one comfort element comprising pet comfort;

the access is calculated as the maximum score in response to 2 multi-modal public transportation options being within a quarter mile and one transportation element comprising bicycles and parking;

the vibrance is calculated as the maximum score in response to the access being the maximum score and one of a tourist destination, a restaurant, a sidewalk café, a plaza, and an open space;

the interest is calculated as the maximum score in response to greater than 50 percent block permeability, greater than 50 percent block transparency, and one element of interest;

the legibility is calculated as the maximum score in response to 100 percent spatial uniqueness, sense of place, landmark, historic district, and/or tourist destination; and the social equity is calculated as the maximum score in response to American with Disabilities Act (ADA) access and inclusiveness of children, elderly, adults, and teens.

18. The computer program product of claim 16, wherein:

the natural beauty is calculated as a maximum score in response to greater than 50 percent vegetation cover and two elements of water and/or landform;

the manmade beauty is calculated as the maximum score in response to building facade compatibility, architecture detail at street level and 2 design elements or a park and 2 design elements;

the sidewalk utility is calculated as the maximum score in response to more than 5 utility elements comprising ease of movement, seating, sidewalk amenities, lighting, sidewalk width, obstructions, and vegetation;

the frontage utility is calculated as the maximum score in response to mixed or commercial use, the commercial use comprising food, retail, and specialty stores;

the safety is calculated as the maximum score in response to good pavement quality and 2 safety elements selected from felony reports, lighting, building condition, and cameras;

the comfort is calculated as the maximum score in response to seating, shade, a correct width, and one comfort element comprising pet comfort;

the access is calculated as the maximum score in response to 2 multi-modal public transportation options being within a quarter mile and one transportation element comprising bicycles and parking;

the vibrance is calculated as the maximum score in response to the access being the maximum score and one of a tourist destination, a restaurant, a sidewalk café, a plaza, and an open space;

the interest is calculated as the maximum score in response to greater than 50 percent block permeability, greater than 50 percent block transparency, and one element of interest;

the legibility is calculated as the maximum score in response to 100 percent spatial uniqueness, sense of place, landmark, historic district, and/or tourist destination; and the social equity is calculated as the maximum score in response to American with Disabilities Act (ADA) access and inclusiveness of children, elderly, adults, and teens.

\* \* \* \* \*